US008862775B2

(12) United States Patent
Chiueh et al.

(10) Patent No.: US 8,862,775 B2
(45) Date of Patent: Oct. 14, 2014

(54) NETWORK SERVER AND LOAD BALANCING ROUTING METHOD FOR NETWORKS THEREOF (75) Inventors: Tzi-Cker Chiueh, Taipei (TW);
Ming-Chao Hsu, Hsinchu (TW);
Cheng-Chun Tu, Stony Brook, NY (US)

(73) Assignee: Industrial Technology Research Institute, Hsinchu (TW)

( * ) Notice: Subject to any disclaimer, the term of this patent is extended or adjusted under 35 U.S.C. 154(b) by 789 days.

(21) Appl. No.: 12/954,677

(22) Filed: Nov. 26, 2010

(65) Prior Publication Data

US 2012/0137021 A1 May 31, 2012

(51) Int. Cl.
*G06F 15/177* (2006.01)
*G06F 15/173* (2006.01)
*G06F 15/16* (2006.01)

(52) U.S. Cl.
USPC ............................ 709/241; 709/221; 709/229

(58) Field of Classification Search
USPC .................. 709/239–242, 232, 221, 226, 229
See application file for complete search history.

(56) References Cited

U.S. PATENT DOCUMENTS

| 3,735,362 | A | * | 5/1973 | Ashany et al. | 710/316 |
|---|---|---|---|---|---|
| 5,253,248 | A | * | 10/1993 | Dravida et al. | 370/228 |
| 5,596,722 | A | | 1/1997 | Rahnema | |
| 5,872,773 | A | | 2/1999 | Katzela et al. | |
| 6,195,354 | B1 | | 2/2001 | Skalecki et al. | |
| 6,256,309 | B1 | * | 7/2001 | Daley et al. | 370/395.43 |
| 6,370,119 | B1 | * | 4/2002 | Basso et al. | 370/252 |
| 7,187,652 | B2 | | 3/2007 | Lee et al. | |
| 7,590,149 | B1 | * | 9/2009 | Bharali et al. | 370/468 |
| 2002/0141342 | A1 | * | 10/2002 | Furman et al. | 370/235 |
| 2003/0110354 | A1 | * | 6/2003 | Tanaka et al. | 711/114 |
| 2003/0158964 | A1 | * | 8/2003 | Kobayashi | 709/238 |
| 2004/0029553 | A1 | * | 2/2004 | Cain | 455/403 |
| 2004/0107285 | A1 | * | 6/2004 | Larson et al. | 709/229 |
| 2005/0208949 | A1 | | 9/2005 | Chiueh | |
| 2007/0177604 | A1 | * | 8/2007 | Ozawa et al. | 370/395.2 |
| 2008/0040509 | A1 | * | 2/2008 | Werb et al. | 709/242 |
| 2008/0059602 | A1 | * | 3/2008 | Matsuda et al. | 709/212 |
| 2008/0212481 | A1 | * | 9/2008 | Dolev | 370/236 |

FOREIGN PATENT DOCUMENTS

| CN | 101155137 | 4/2008 |
|---|---|---|
| TW | 201025120 | 7/2010 |

OTHER PUBLICATIONS

"Office Action of China Counterpart Application", issued on Dec. 4, 2013, p. 1-p. 10.

* cited by examiner

*Primary Examiner* — Ebrahim Golabbakhsh
(74) *Attorney, Agent, or Firm* — Jianq Chyun IP Office (57) ABSTRACT

A load balancing routing method for networks is disclosed. The routing method includes following steps. A network topology graph and a plurality of expected bandwidth demands corresponding to a plurality of source-destination pairs are received by a network server. A plurality of link criticalities of a plurality of links established according to the source-destination pairs is calculated by the network server according to the network topology graph and the expected bandwidth demands. A plurality of expected loads of the links is calculated by the network server according to the link criticalities. A plurality of cost values is calculated according to a plurality of residual capacities of the links and the corresponding expected loads. A better transmission path corresponding to each of the source-destination pairs is selected by the network server according to the weighted sum of the cost values corresponding to the links in the source-destination pair.

22 Claims, 6 Drawing Sheets

NETWORK SERVER AND LOAD BALANCING ROUTING METHOD FOR NETWORKS THEREOF

TECHNICAL FIELD

The disclosure relates to a network server and a load balancing routing method for networks thereof, and more particularly, to a dynamic load balancing routing method for networks.

BACKGROUND

Network users and network traffic have increased considerably along with the information explosion. In a network system, how to find the better transmission path between each source-destination pair has become one of the major subjects to network engineers.

Conventionally, different network load balancing routing methods have been provided. For example a min-hop algorithm is provided, wherein the numbers of hops passed by all possible transmission paths between a source node and a destination node are calculated, and the transmission path having the least hop number is selected as the best transmission path between the source-destination pair. This conventional technique is very straightforward. However, it cannot provide better routing result since only the numbers of hops but not the corresponding bandwidths and loads are taken into consideration.

In addition, a widest shortest path (WSP) algorithm has been provided conventionally. This WSP algorithm is derived from the foregoing min-hop algorithm, wherein the shortest transmission path (having the least hops) between a source-destination pair is selected, and if multiple shortest transmission paths are selected, the best transmission path is selected according to the maximum of the minimum link capacity among all candidate paths. Because this WSP algorithm is still based on the rule that the shortest path is first selected, it cannot provide a better routing result for the bandwidth demands and the loads of the shortest paths cannot be both taken into consideration.

SUMMARY

A load balancing routing method for networks is introduced herein.

The present disclosure is directed to a load balancing routing method for networks, wherein the better transmission paths corresponding to a plurality of source-destination pairs are efficiently calculated.

The present disclosure is directed to a network server for obtaining a better transmission paths corresponding to a plurality of source-destination pairs efficiently.

One of the embodiments provides a load balancing routing method for networks. The routing method includes following steps. First, a network topology graph and a plurality of expected bandwidth demands corresponding to a plurality of source-destination pairs are received by a network server. Then, a plurality of link criticalities of a plurality of links established according to the source-destination pairs is calculated by the network server according to the network topology graph and the expected bandwidth demands, and a plurality of expected loads of the links is calculated by the network server according to the link criticalities. Besides, a plurality of cost values is calculated by the network server according to a plurality of residual capacities and the corresponding expected loads of the links. Finally, a better transmission path corresponding to each of the source-destination pairs is selected by the network server according to the weighted sum of the cost values corresponding to the links in the source-destination pair.

One of the embodiments provides a network server comprising a processor. The processor used to receive a network topology graph and a plurality of expected bandwidth demands corresponding to a plurality of source-destination pairs, and calculates a plurality of link criticalities of a plurality of links established based on the source-destination pairs according to the network topology graph and the expected bandwidth demands and calculates a plurality of expected loads of the links according to the link criticalities. The processor further calculates a plurality of cost values according to a plurality of residual capacities and the corresponding expected loads of the links and selects a better transmission path corresponding to each of the source-destination pairs according to a weighted sum of the cost values corresponding to the links in the source-destination pair.

As described above, in the present disclosure, the link criticalities and the expected loads are calculated by using the expected bandwidth demands of a plurality of source-destination pairs of a network and the network topology graph thereof, and the cost values are then calculated according to the link criticalities, the expected loads, and the residual capacities or any combination of above. Eventually, the better transmission paths are selected according to the weighted sum of the cost values corresponding to the links. Thereby, the transmission paths in an immerse and complicated tree-structure network can be efficiently arranged so that the performance of the entire network system can be improved.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
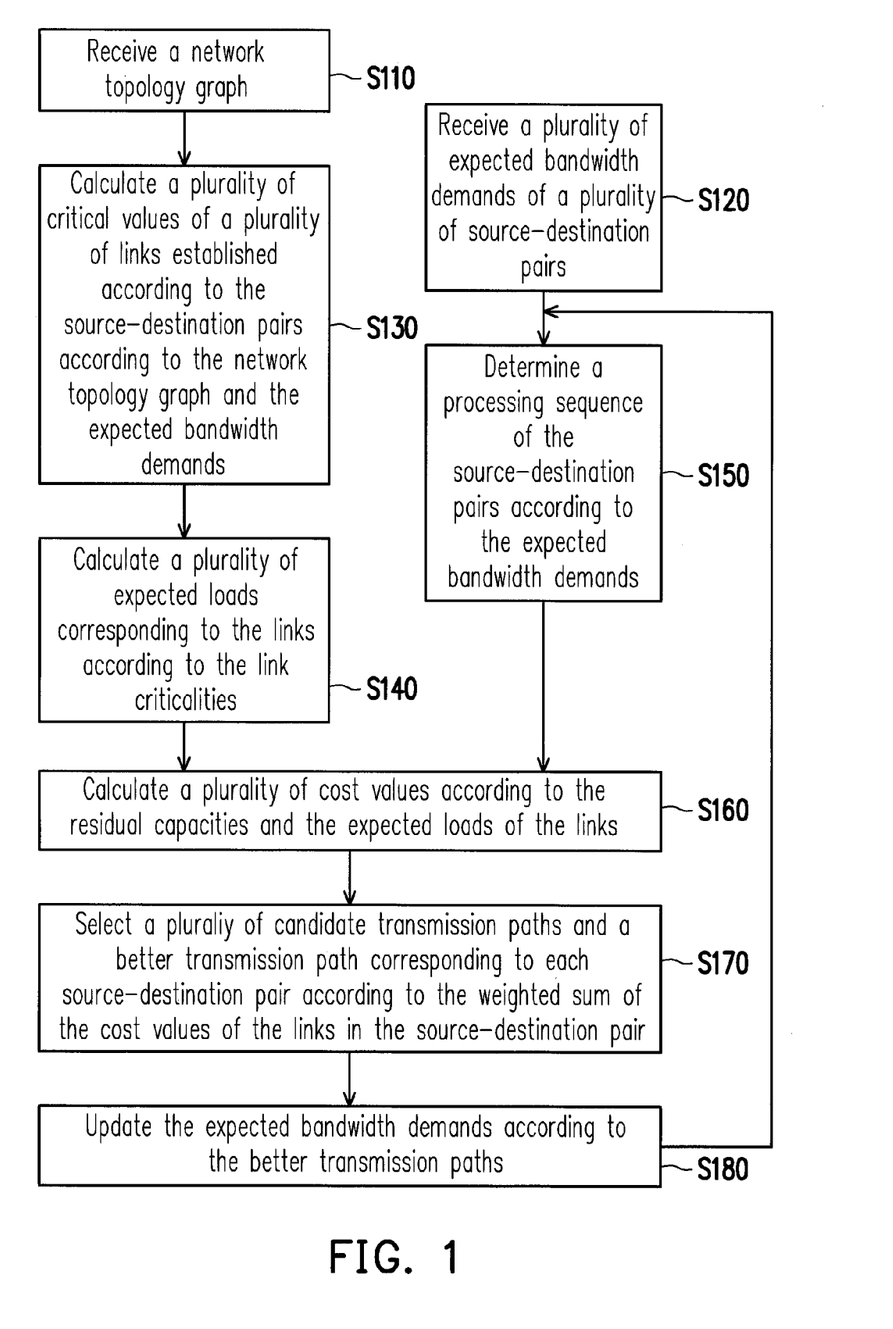
FIG. 1 is a flowchart of a routing method according to an embodiment of the present disclosure.

An embodiment provides a routing method. FIG. 1 is a flowchart of a routing method according to an embodiment of the present disclosure. Referring to FIG. 1, the routing method includes following steps. First, a network topology graph is received by a network server (not shown) (S110), and meanwhile, a plurality of expected bandwidth demands of a plurality of source-destination pairs corresponding to the network topology graph is received by the network server (S120). The network topology graph is obtained in advance according to a plurality of source-destination pairs in a network system on which a network routing is to be performed. The expected bandwidth demands of the source-destination pairs are obtained according to the actual operation of the network. In other words, the expected bandwidth demands varied with the actual operation state of the network. In the present embodiment, the expected bandwidth demands are periodically updated according to the actual operation state of the network server regarding the network.

Then, a plurality of link criticalities of a plurality of links established according to the source-destination pairs is calculated by the network server according to the network topology graph and the expected bandwidth demands (S130). Besides, after the link criticalities are obtained, a plurality of expected loads corresponding to the links is calculated by the network server according to the link criticalities (S140). Herein each source-destination pair contains a plurality of links. Regarding each link, the more transmission paths among all possible transmission paths between a source-destination pair (s, d) pass through the link 1, the higher link criticality the link 1 has corresponding to the source-destination pair (s, d). The link criticality of the link 1 corresponding to the source-destination pair (s, d) is $\phi_1(s, d)=y/x$, wherein x is the total number of paths between the source-destination pair (s, d), and y is the total number of paths between the source-destination pair (s, d) that pass through the link 1.

Additionally, the expected load of each link in the source-destination pair (s, d) is related to the link criticality and the expected bandwidth demand of the link. In short, a link having a higher link criticality and a higher expected bandwidth demand has a higher expected load. In the present embodiment, the expected load of the link 1 is equal to the sum of products between the link criticalities and the expected bandwidth demands of the link 1 calculated in all source-destination pairs, which is expressed as:

$$\phi_1 = \Sigma_{(s,d)} \phi_1(s,d) B(s,d) \qquad (1)$$

In foregoing expression (1), $\phi_1$ is the expected load of the link 1, and B(s,d) is the expected bandwidth demand of the link 1 in the source-destination pair (s,d).

After that, all the source-destination pairs are sorted by the network server. Herein the processing sequence of the source-destination pairs is determined according to the expected bandwidth demands (S150). In short, the busier source-destination pairs (having greater expected bandwidth demands) among all the source-destination pairs are arranged to be processed earlier. Contrarily, the less busy source-destination pairs (having smaller expected bandwidth demands) are arranged to be processed later. Namely, the processing sequence is determined by arranging the source-destination pairs in descending order according to the expected bandwidth demands.

After the expected loads are calculated, cost values of the links are calculated by the network server according to the residual capacities and the expected loads of the links (S160). For example, the cost value of the link 1 is obtained by dividing the expected load $\phi_1$ of the link 1 by the residual capacity $R_1$ of the link 1 (i.e., the cost value of link 1 is cost(1)=$\phi_1/R_1$).

Thereafter, the better transmission path for each source-destination pair is selected by the network server according to the weighted sum of the cost values of the links in the source-destination pair (S170). To be specific, the network server first calculates weighted sum of the cost values corresponding to the links in each source-destination pair and selects one or multiple transmission paths having the smallest cost value sum. The network server selects some transmission paths having the smaller cost value sum as the candidate transmission paths. Then, the network server selects the better transmission path among the candidate transmission paths according to the smallest weighted sum of the cost values. In one embodiment, the weighted sum is operated according to the incremental forwarding table entries of each of the candidate transmission paths, hop counts of each of the candidate transmission paths and sum processor's (CPU) speed of switches along each of the candidate transmission paths or any combination of aboves. Namely, the transmission path having the least content in the corresponding forwarding table is selected among of the candidate transmission paths as the better transmission path.

However, in order to further improve the performance of the network system, in the present embodiment, one or multiple second-better transmission paths may be further selected besides the better transmission path as backup transmission paths. When the original better transmission path is broken or congested, the network server can replace the original better transmission path with a backup transmission path so that the network traffic can be instantly restored.

Please notice here, the backup transmission paths could be calculated in advance such as that when bad situations happen, the broken or congested transmission path can be replaced immediately.

In addition, after the better transmission path of a source-destination pair is selected by the network server, the corresponding expected bandwidth demand received by the network server is updated (S180). When the network server determines the better transmission path of the next source-destination pair, it has carry out its calculations by using the updated expected bandwidth demand.

As described above, in the present embodiment, the transmission paths of the source-destinations pair are planned through the calculations of the link criticalities, the expected loads, forwarding table size, and the cost values or any combination of above according to the processing sequence of the source-destination pairs, so as to achieve a better network routing result.

Please notice here, in the present embodiment, it is not necessary to route all of the source-destination pairs by the steps illustrated in FIG. 1. To tradeoff between computation overhead and final resulting load balance degree, the network server can choose the first x % of all the source-destination pairs to execute the routing steps S110-S170. Wherein, x is a positive number and can de determined by the network server. Then, the rest source-destination pairs are routed using shortest path routing.

Figure 2:
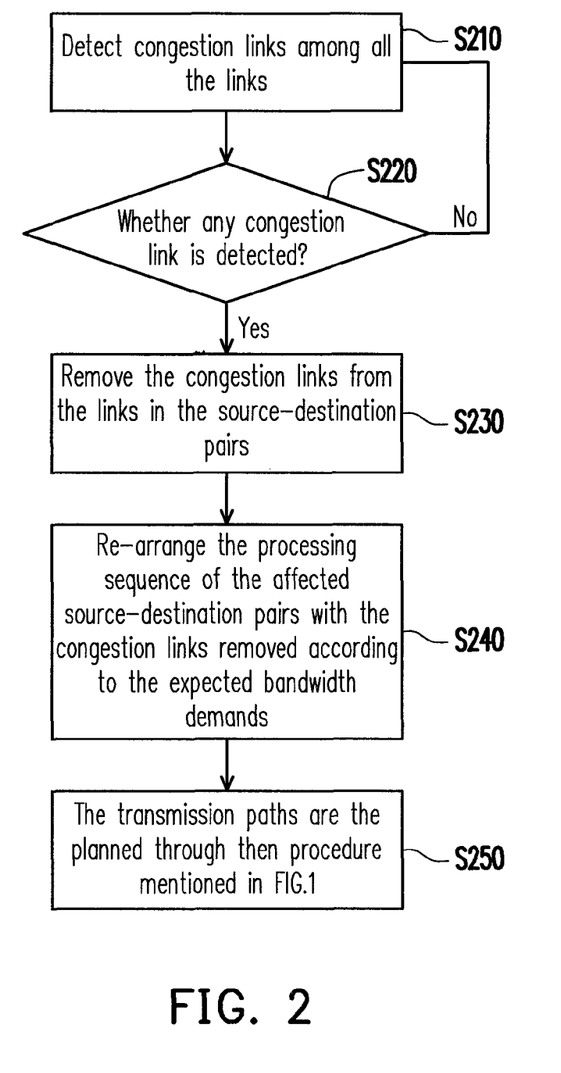
FIG. 2 is a flowchart of a routing method according to another embodiment of the present disclosure.

FIG. 2 is a flowchart of a routing method according to another embodiment of the present disclosure. In the embodiment illustrated in FIG. 2, how it is processed when the network server detects congestion links is explained. First, all the links are detected by the network server to determine whether there is a congestion link (S210). Once at least one congestion link is detected (S220), a congestion link removal operation is performed by the network server on all the source-destination pairs with congestion links (S230). Then, the processing sequence of the source-destination pairs affected by the congest link mentioned above is re-arranged by the network server (S240), and the transmission paths are then planned through the procedure described in foregoing embodiment based on this updated processing sequence (S250).

After the congestion links are removed, the network server updates the expected bandwidth demands of the source-destination pairs and plans the transmission paths by using the updated expected bandwidth demands again.

The operation details of routing method provided by the present disclosure will be described with reference to actual examples so that the spirit of the present disclosure can be well understood.

Figure 3A:
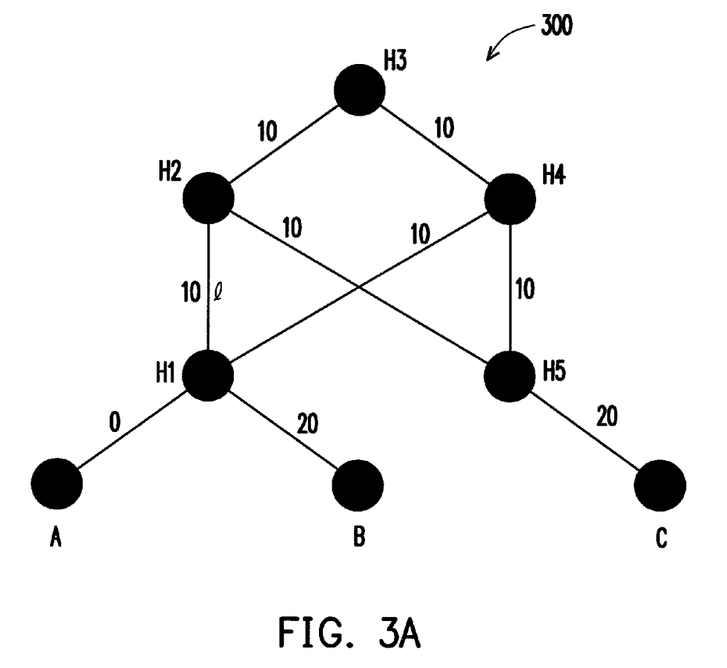
FIGS. 3A-3C respectively illustrate an implementation of the present disclosure.
Figure 3B:
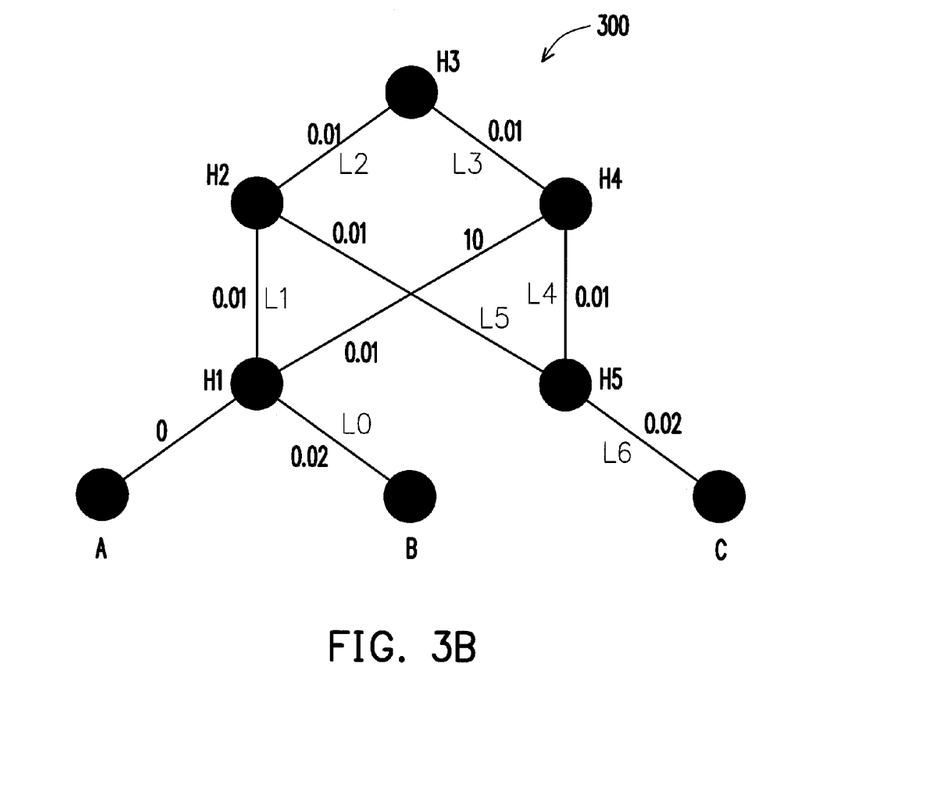
Figure 3C:
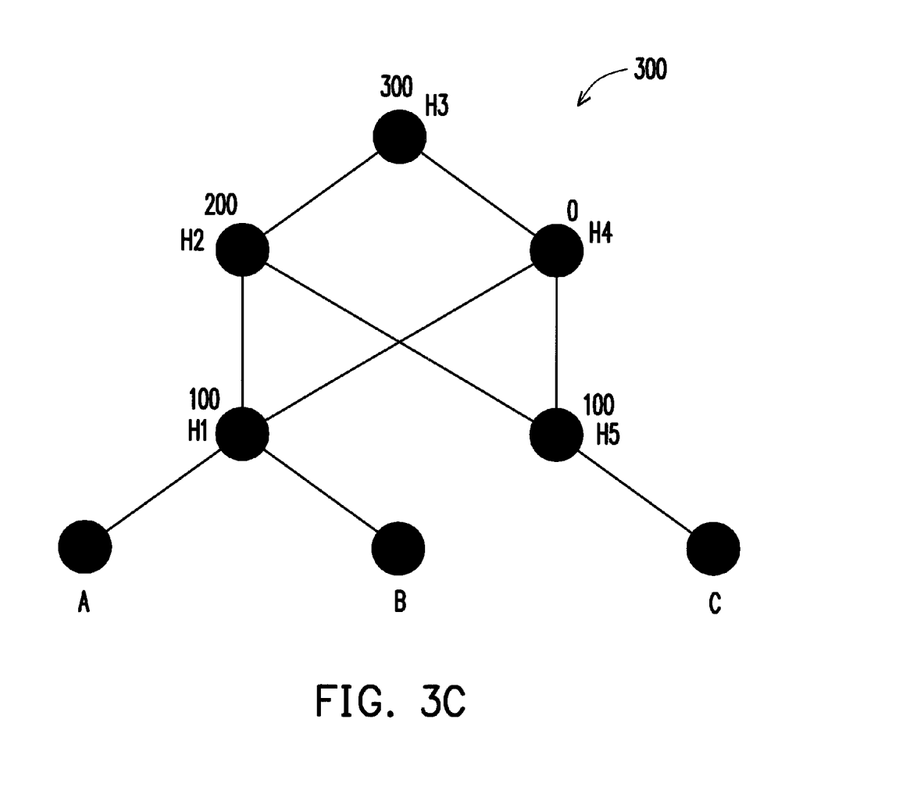

FIGS. 3A-3C respectively illustrate an implementation of the present disclosure. Referring to FIG. 3A first, the network topology graph 300 includes nodes A, B, and C and nodes H1-H5, and there are a plurality of links between these nodes. Taking the link 1 as an example, there are four transmission paths in the source-destination pair (B, C) composed of the node B and the node C, and the four transmission paths are respectively B→H1→H2→H3→H4→H5→C, B→H1→H2→H5→C, B→H1→H4→H5→C, and B→H1→H4→H3→H2→H5→C. Because two of the transmission paths have to pass through the link 1, the link criticality of the link 1 corresponding to the source-destination pair (B, C) is 2/4=0.5. Besides, there are also four transmission paths in the source-destination pair (A, C), and because two of the transmission paths pass through the link 1, the link criticality of the link 1 corresponding to the source-destination pair (A, C) is 2/4=0.5.

In addition, it is assumed that the expected bandwidth demands corresponding to the source-destination pair (B, C) is 20 Mbytes, the bandwidth is evenly distributed to each path in the source-destination pair (B, C), and when there is no expected bandwidth demand corresponding to the source-destination pair (A, C) and (A, B), the expected load of the link 1 is equal to 0.5×20=10.

Referring to FIG. 3B, in the network topology graph 300, the expected loads of the links L0-L6 are respectively divided by the residual capacities of the corresponding links to obtain the cost values of the links L0-L6. Herein the cost values of the links L0 and L6 are 0.02, and the cost values of the links L1-L5 are 0.01. When the network server selects the better transmission path between the source-destination pair (B, C), it first calculates the weighted sum of the cost values of the transmission paths. The weighted sum of the cost values of the transmission path B→H1→H2→H3→H4→H5→C is 0.08, the weighted sum of the cost values of the transmission path B→H1→H2→H5→C is 0.06, the sum of the cost values of the transmission path B→H1→H4→H5→C is 0.06, and the weighted sum of the cost values of the transmission path B→H1→H4→H3→H2→H5→C is 0.08. Since both the transmission path B→H1→H2→H5→C and the transmission path B→H1→H4→H5→C has the smallest cost value sum 0.06, the network server selects one of the transmission paths B→H1→H2→H5→C and B→H1→H4→H5→C as the better transmission path and the other one as a backup transmission path.

Next, referring to FIG. 3C, the network server further selects the better transmission path according to the quantities of forwarded information in the forwarding tables of the nodes H1-H5. Each of the nodes H1-H5 has one forwarding table for recording the communication states thereof. That is, if the node having high quantities of forwarded information in the forwarding table means the node is busy. Herein the remaining entries in the forwarding tables of the nodes H1-H5 are respectively 100, 200, 300, 0, and 100, as illustrated in FIG. 3C. Namely, the forwarding table of the node H4 records the most forwarded information, and the forwarding table of the node H3 records the least forwarded information.

The network server respectively calculates the total quantities of forwarded information recorded in the forwarding tables of the transmission path B→H1→H2→H5→C and the transmission path B→H1→H4→H5→C to obtain the remaining space 400 in the forwarding table of the transmission path B→H1→H2→H5→C and the remaining space 200 in the forwarding table of the transmission path B→H1→H4→H5→C. Namely, the forwarding table of the transmission path B→H1→H2→H5→C records less forwarded information. Accordingly, the network server selects the transmission path B→H1→H2→H5→C as the better transmission path.

Figure 4:
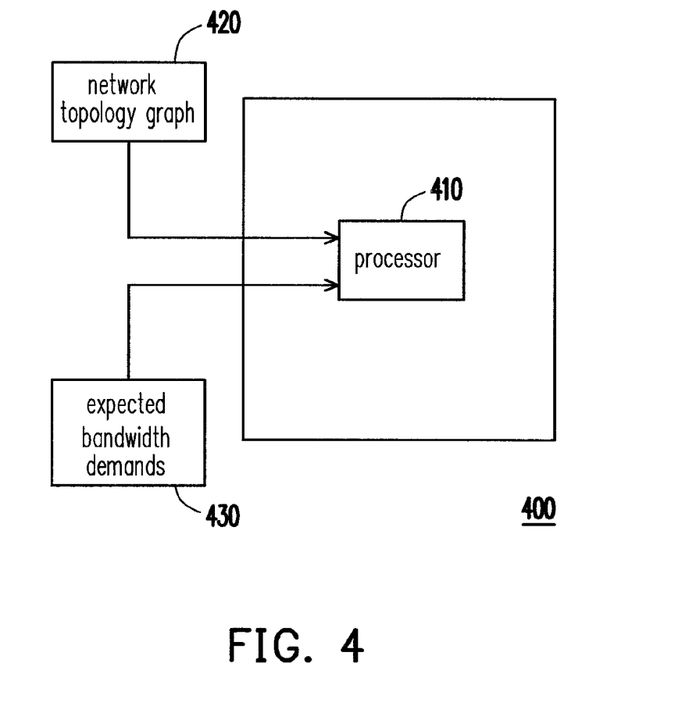
FIG. 4 is a block diagram of a network server according to an embodiment of the present disclosure.

An embodiment provides a network server. FIG. 4 is a block diagram of a network server according to an embodiment of the present disclosure. The network server 400 includes a processor 410. The processor 410 used to receive a network topology graph 420 and a plurality of expected bandwidth demands 430 corresponding to a plurality of source-destination pairs, and calculates a plurality of link criticalities of a plurality of links established based on the source-destination pairs according to the network topology graph and the expected bandwidth demands and calculates a plurality of expected loads of the links according to the link criticalities. The processor 410 further calculates a plurality of cost values according to a plurality of residual capacities and the corresponding expected loads of the links and selects a better transmission path corresponding to each of the source-destination pairs according to a weighted sum of the cost values corresponding to the links in the source-destination pair.

Technically, a purely sum is a special case of a weighted sum.

In summary, in the present disclosure, the better transmission path in each source-destination pair is selected according to factors (such as the expected bandwidth demands, the link criticalities, the expected loads, the residual capacities, and the quantities of forwarded information in the forwarding tables and the hop count and switch processing power) that affect the transmission of data in the network. Thereby, a better routing result can be achieved by taking all different factors into consideration. In addition, in the present disclosure, the routing operation is made very close to the bandwidth demands of actual network operations by dynamically updating the expected bandwidth demands. Thereby, the routing result is made very practical.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A load balancing routing method for networks, comprising:
receiving a network topology graph and a plurality of expected bandwidth demands corresponding to a plurality of source-destination pairs by using a network server;
calculating a plurality of link criticalities of a plurality of links established based on the source-destination pairs according to the network topology graph and the expected bandwidth demands and calculating a plurality of expected loads of the links according to the link criticalities by using the network server, and the link criticality corresponding to each of the links is y/x, wherein x is a total number of paths between the source-destination pairs, y is a number of paths between the source-destination pairs that pass through the link, and the expected load of each of the links is equal to a sum of products between the link criticalities and the expected bandwidth demands of the link corresponding to all source-destination pairs;
calculating a plurality of cost values according to a plurality of residual capacities and the corresponding expected loads of the links by using the network server, wherein each of the cost values is obtained by dividing the expected load corresponding to each of the links by the residual capacity corresponding to the link; and selecting a better transmission path corresponding to each of the source-destination pairs according to a weighted sum of the cost values corresponding to the links in the source-destination pair by using the network server.

2. The routing method according to claim 1, wherein the step of "selecting the better transmission path corresponding to each of the source-destination pairs according to the weighted sum of the cost values corresponding to the links in the source-destination pair by using the network server" comprises:

selecting a plurality of candidate transmission paths according to the weighted sum of the cost values corresponding to the links in each of the source-destination pairs by using the network server; and selecting the better transmission path by the weighted sum which obtained according to a plurality of forwarding tables in the transmission paths by using the network server.

3. The routing method according to claim 2, wherein the step of "selecting the better transmission path according to the forwarding tables in the transmission paths by using the network server" comprises:

calculating a total quantity of forwarded information recorded in the forwarding tables and selecting the transmission path having the smallest total quantity among the transmission paths as the better transmission path by using the network server.

4. The routing method according to claim 1 further comprising:

arranging a processing sequence of the source-destination pairs according to the expected bandwidth demands by using the network server.

5. The routing method according to claim 1 further comprising:

updating the expected bandwidth demands according to the better transmission path by using the network server.

6. The routing method according to claim 1 further comprising:

detecting a congestion link among the links by using the network server; and removing the congestion link from the links of the source-destination pairs by using the network server.

7. The routing method according to claim 6 further comprising:

re-arranging the processing sequence of the source-destination pairs after the congestion link is removed according to the expected bandwidth demands by using the network server.

8. The routing method according to claim 1 further comprising:

selecting at least one second-better transmission path corresponding to each of the source-destination pairs as at least one backup transmission path according to a weighted sum of the cost values corresponding to the links in the source-destination pair.

9. The routing method according to claim 8 further comprising:

when the better transmission path comprises a congestion link, replacing the better transmission path with the backup transmission path as a new better transmission path.

10. The routing method according to claim 1, wherein the step of "selecting the better transmission path corresponding to each of the source-destination pairs according to the weighted sum of the cost values corresponding to the links in the source-destination pair by using the network server" comprising:

selecting a plurality of candidate transmission paths according to a plurality sums of the cost values; and selecting the better transmission path among the candidate transmission paths according to the weighted sum of the cost values.

11. The routing method according to claim 10, wherein the weighted sum is operated according to at least one of a plurality of forwarding table entries of each of the candidate transmission paths, hop counts of each of the candidate transmission paths and sum processor's speed of switches along each of the candidate transmission paths.

12. A network server, comprising:

a processor, used to receive a network topology graph and a plurality of expected bandwidth demands corresponding to a plurality of source-destination pairs, and calculates a plurality of link criticalities of a plurality of links established based on the source-destination pairs according to the network topology graph and the expected bandwidth demands and calculates a plurality of expected loads of the links according to the link criticalities, wherein the link criticality corresponding to each of the links is y/x, wherein x is a total number of paths between the source-destination pairs, y is a number of paths between the source-destination pairs that pass through the link, and the expected load of each of the links is equal to a sum of products between the link criticalities and the expected bandwidth demands of the link corresponding to all source-destination pairs, the processor further calculates a plurality of cost values according to a plurality of residual capacities and the corresponding expected loads of the links, wherein each of the cost values is obtained by dividing the expected load corresponding to each of the links by the residual capacity corresponding to the link, and the processor selects a better transmission path corresponding to each of the source-destination pairs according to a weighted sum of the cost values corresponding to the links in the source-destination pair.

13. The network server according to claim 12, the processor selects a plurality of candidate transmission paths according to the weighted sum of the cost values corresponding to the links in each of the source-destination pairs by using the network server and selects the better transmission path by the weighted sum which obtained according to a plurality of forwarding tables in the transmission paths.

14. The network server according to claim 13, the processor calculates a total quantity of forwarded information recorded in the forwarding tables and selecting the transmission path having the smallest total quantity among the transmission paths as the better transmission path.

15. The network server according to claim 12, the processor arranges a processing sequence of the source-destination pairs according to the expected bandwidth demands.

16. The network server according to claim 12, the processor updates the expected bandwidth demands according to the better transmission path.

17. The network server according to claim 15, the processor detects a congestion link among the links by using the network server, and removes the congestion link from the links of the source-destination pairs.

18. The network server according to claim 17, the processor further re-arranges the processing sequence of the source-destination pairs after the congestion link is removed according to the expected bandwidth demands.

19. The network server according to claim 12, the processor selects at least one second-better transmission path corresponding to each of the source-destination pairs as at least one backup transmission path according to a weighted sum of the cost values corresponding to the links in the source-destination pair.

20. The network server according to claim 19, when the better transmission path comprises a congestion link, the processor replaces the better transmission path with the backup transmission path as a new better transmission path.

21. The network server according to claim 12, the processor selects a plurality of candidate transmission paths according to a plurality sums of the cost values, and selects the better transmission path among the candidate transmission paths according to the weighted sum of the cost values.

22. The network server according to claim 21, the weighted sum is operated according to at least one of a plurality of forwarding table entries of each of the candidate transmission paths, hop counts of each of the candidate transmission paths and sum processor's speed of switches along each of the candidate transmission paths.

* * * * *